United States Patent [19]

Donnay

[11] 3,873,018

[45] Mar. 25, 1975

[54] EASILY RUPTURABLE BAND OF TAPE

[75] Inventor: James A. Donnay, St. Paul, Minn.

[73] Assignee: Minnesota Mining and Manufacturing Company, St. Paul, Minn.

[22] Filed: Feb. 20, 1973

[21] Appl. No.: 333,879

[52] U.S. Cl. ............... 229/51 TS, 156/86, 156/187, 156/257, 161/38, 161/39, 161/167, 229/51 AS, 215/256

[51] Int. Cl. ...................... B32b 31/00, B65d 51/20

[58] Field of Search ......... 156/84, 85, 86, 193, 187, 156/257, 268, 213, 215, 247, 259, 323; 229/51 TS, 51 R, 51 AS, 87 R, 133; 161/70, 71, 78, 86, 101, 146, 147, 38, 39, 167, 406, 145; 215/DIG. 2, 38 A, 80, 82, 84; 264/342 R, 342 RE

[56] References Cited

UNITED STATES PATENTS

| | | | |
|---|---|---|---|
| 2,029,131 | 1/1936 | Shoemaker | 156/213 |
| 2,161,561 | 6/1939 | Dalton | 156/86 |
| 2,790,285 | 4/1967 | Pike et al. | 156/86 |
| 3,266,965 | 8/1966 | Spees | 229/51 AS |
| 3,456,780 | 7/1969 | Forman | 229/51 AS |
| 3,579,397 | 5/1971 | Schwarzkopf | 156/251 |
| 3,620,896 | 11/1971 | Glasgow | 156/85 |
| 3,641,732 | 2/1972 | Fujio | 229/51 TS |
| 3,764,351 | 10/1973 | Whittington et al. | 229/51 TS |
| 3,770,556 | 11/1973 | Evans et al. | 156/86 |

Primary Examiner—Douglas J. Drummond
Assistant Examiner—F. Frisenda, Jr.
Attorney, Agent, or Firm—Alexander, Sell, Steldt & Delahunt

[57] ABSTRACT

A band of tape that may be easily ruptured is applied around an article by use of a tape assembly that comprises a heat-shrinkable backing, a layer of adhesive carried on the backing for adhering the tape assembly to the article, and a non-adhesive tear strip that is narrower than the backing and is positioned between the layer of adhesive and the article. Short longitudinally extending cuts, parallel to, and on both sides of the tear strip, are made in an end of the backing that is exposed when the tape assembly is wrapped around the article. After application of the tape assembly around an article, the tape assembly is subjected to an elevated temperature sufficient to shrink the backing. Since the backing shrinks, while the tear strip adhered to the backing by the layer of adhesive either does not shrink or shrinks less than the backing, the portion of the tape assembly located between the longitudinal cuts in the backing curves outwardly to form a pull-tab.

10 Claims, 5 Drawing Figures

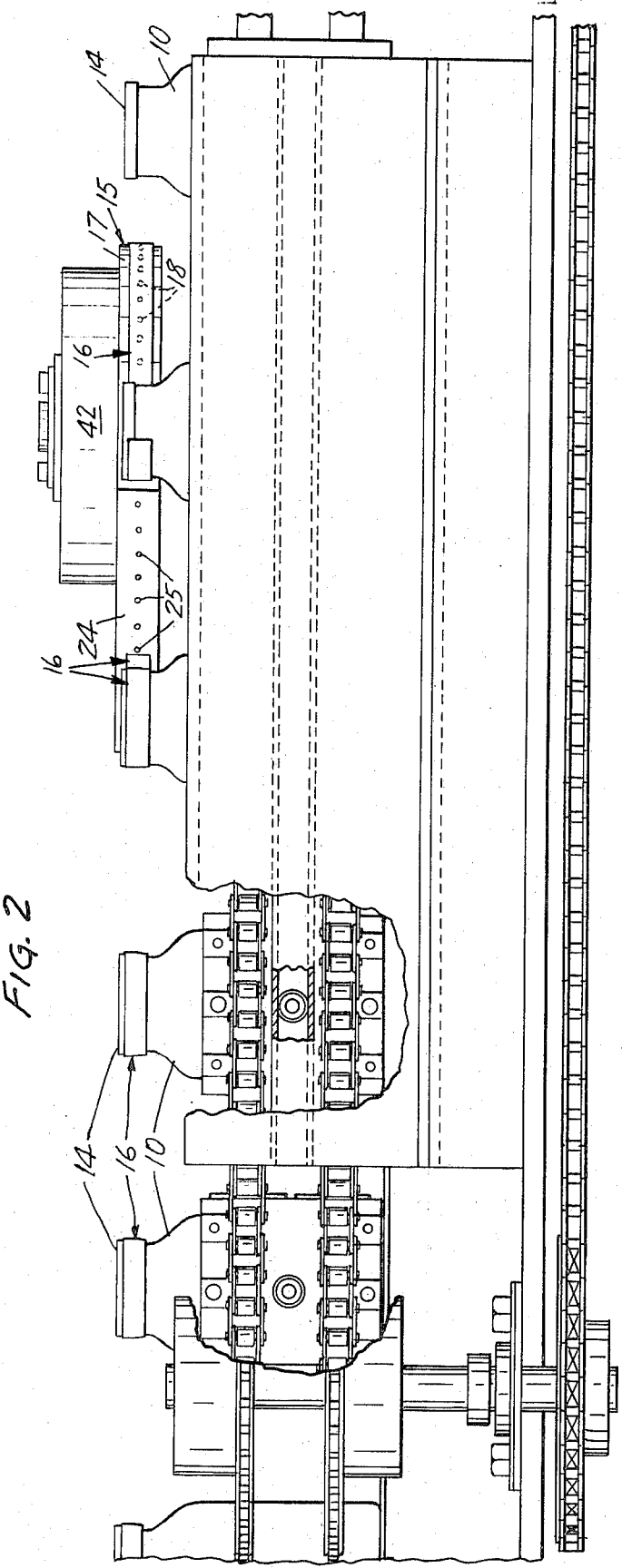
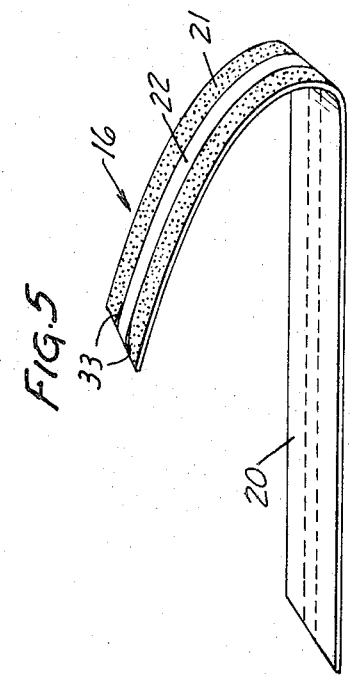
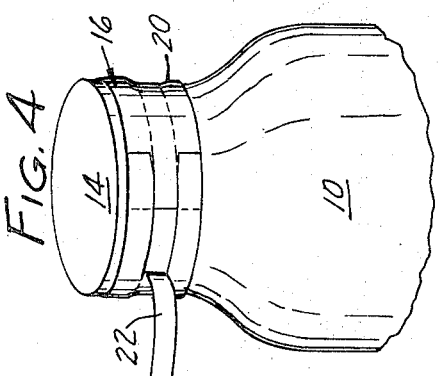
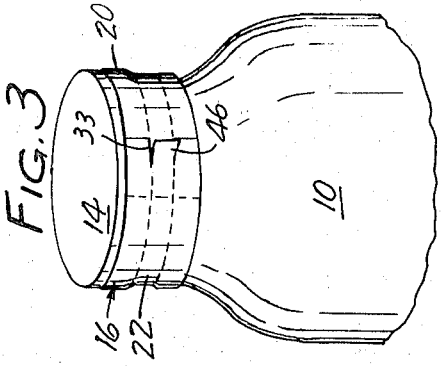

EASILY RUPTURABLE BAND OF TAPE

BACKGROUND OF THE INVENTION

Present-day package designs often use a band of tape around a packaged article to provide a tamper-proof seal or to hold two parts of the article together. For example, tamper-proof seals are formed by wrapping a band of tape around the juncture of a container and container cover. Or two containers, such as cans of food that are used in preparing a single dish or meal, are held together by wrapping a band of tape around the juncture of the two containers.

A problem in the use of such bands of tape is that they are difficult for a consumer to remove. The tape is held to the article by an aggressive adhesive, generally a pressure-sensitive adhesive, and often the tape is heat-shrunk after application to the article to form a tight-fitting seal. The consumer must generally either patiently pick at the end of the tape and peel it away, or make an inconvenient and risky cut in the band with a knife. To permit use of bands of tape for sealing and holding functions to be more widespread and convenient, provision must be made for easing the opening of such bands.

SUMMARY OF THE INVENTION

Briefly, bands of tape that may be easily ruptured are generally provided around an article by this invention by 1. wrapping an elongated tape assembly around an article to form an overlapping band, the tape assembly comprising (a) a backing that is heat-shrinkable at a useful elevated temperature, (b) a layer of adhesive carried on one surface of said backing for adhering the tape assembly to the article, and (c) a non-adhesive tear strip that is substantially less heat-shrinkable at said elevated temperature than the backing and has a width narrower than the width of the backing, the tear strip being disposed between the layer of adhesive and the article, in longitudinal alignment with the backing, and intermediate the outer edges of the backing;

2. making short longitudinal cuts in the exposed overlapping end of the backing on each side of the tear strip; and 3. subjecting the wrapped article to heat sufficient to shrink the backing of the tape assembly.

Preferably, the layer of adhesive on the backing is a pressure-sensitive adhesive, so that the tape assembly adheres to the article immediately after wrapping it around the article. And most conveniently the longitudinal cuts are generally made prior to wrapping of the tape assembly onto the article.

DESCRIPTION OF THE DRAWINGS

FIG. 2 is an elevation view taken along the lines 2—2 of FIG. 1;

FIGS. 3 and 4 are perspective views of a container with a tape seal of the invention in place; and FIG. 5 is a perspective view of a tape assembly used in practicing the present invention.

DETAILED DESCRIPTION

Figure 1:
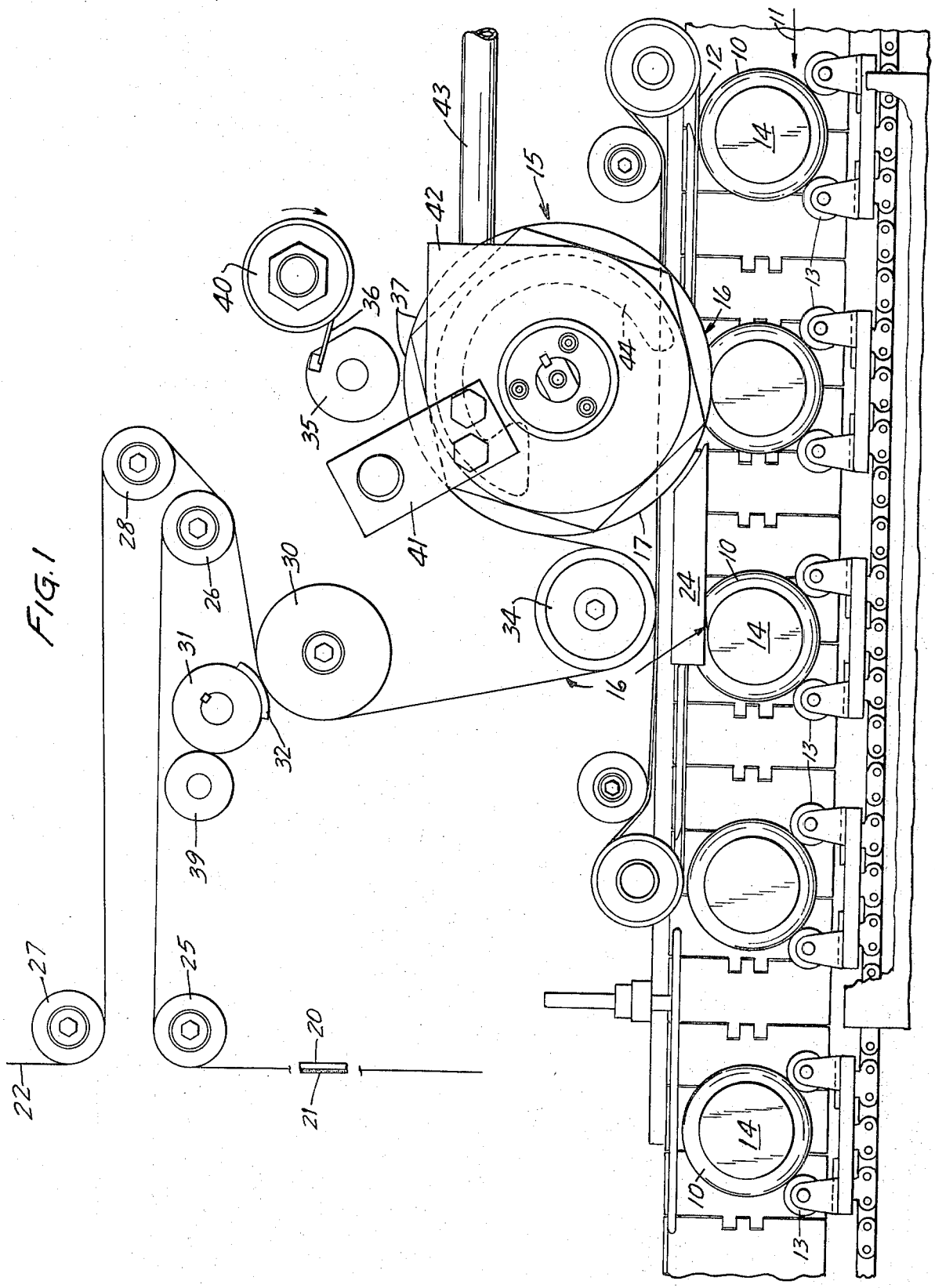
FIG. 1 is a top view of part of an apparatus used to practice the method of the present invention.

The illustrative taping apparatus of FIGS. 1 and 2 is shown as it applies a tape assembly of the invention around the juncture of a bottle and bottle cover; similar apparatus is used to apply tape assemblies around other containers or articles. Bottles 10 approach the taping apparatus along a conveyor belt in the direction of the arrow 11 shown in FIG. 1. As they proceed, each bottle is engaged between a moving belt 12 and two rollers 13, whereupon the bottle 10 rotates. Further advances bring the juncture of the bottle 10 and bottle cover 14 against lengths of a tape assembly 16 that are removably carried on the circumferential edge 17 of an applicator wheel 15. Typically the lengths of tape assembly 16 are held on the applicator wheel 15 by a vacuum within the wheel acting on the length of tape assembly through openings 18 in the edge 17 of the wheel, as will be subsequently described in more detail.

A representative length of tape assembly 16 such as may be carried on the applicator wheel 15 is illustrated in FIG. 5. This tape assembly comprises a backing 20, which is heat-shrinkable at a useful elevated temperature, such as 250°F.; a layer 21 of pressure-sensitive adhesive; and a non-adhesive tear strip 22 adhered to the pressure-sensitive adhesive layer. The pressure-sensitive adhesive layer 21 faces outwardly when the tape assembly 16 is on the applicator wheel 15, so that as the bottle 10 proceeds along the conveyor belt, the tape assembly adheres to, and is wrapped around, the juncture of the bottle cover 14 and bottle 10. In the illustrated apparatus, the wrapping operation continues as the bottle 10 moves down the conveyor belt, with the trailing length of tape assembly 16 held on a vacuum platen 24 that extends tangentially to the wheel 15 and has vacuum-applying openings 25 by which the tape assembly is removably held against the platen.

In this illustrative embodiment, the tape assembly 16 initially comprises two parts fed from two supply rolls (not shown) and assembled before reaching the applicator wheel 15. From one supply roll, the backing 20 carrying the layer 21 of pressure-sensitive adhesive travels around an idler roll 25 to an idler roll 26. The tear strip 22 travels from the second supply roll around idler rolls 27 and 28 and then to the idler roll 26, where it is laminated to the adhesive layer 21 on the backing 20. From the idler roll 26 the tape assembly 16 travels in this illustrative embodiment between a bed wheel 30 and a first cutting wheel 31, which carries two parallel blades 32 that form short longitudinally extending cuts 33 in the backing 20 parallel to and slightly outside the edges of the tear strip 22. The bed wheel 30 preferably has a metal circumferential edge, with an axially central area of the edge providing a cutting surface for the blades 32, and with side areas being knurled in a diamond pattern to provide release characteristics with respect to the adhesive 21 on the tape assembly 16. From the bed wheel 30, the tape assembly 16 travels around idler roll 34 and onto the applicator wheel 15.

A second cutting wheel 35, mounted adjacent the applicator wheel 15, carries a blade 36 that engages hard-metal surface parts 37 of the applicator wheel 15 during rotation of the cutting wheel 35 to sever the tape assembly 16 into lengths sufficient to wrap around the bottle cover; usually the length of tape assembly is long enough to form an overlapping band around the article. The second cutting wheel 35 rotates in timed relation with the first cutting wheel 31, so that the tape assembly 16 is severed by the second cutting wheel at a point intermediate the ends of the longitudinal cuts 33 formed by the cutting wheel 31. Preferably, the trailing end of each length of tape assembly, which becomes the exposed end of the band formed when the tape assembly is wrapped around the bottle, retains the longest part of the longitudinal cuts 33. Generally, the longitudinal cuts in the trailing end of the severed length of tape assembly are between about ⅛ and ¾ inch long, and preferably are between ¼ and ½ inch long. The applicator wheel 15 may rotate at a rate faster than the rate of travel of the tape assembly to the wheel, so that once a length of tape assembly is severed from a continuous length of tape assembly, that length of tape assembly becomes spaced from the next-trailing length of tape assembly.

The wheels 39 and 40 shown in FIG. 1 adjacent the cutting wheels 31 and 35, respectively, are oiler wheels that clean adhesive from the blades of the cutting wheels. Part 41 in FIGS. 1 and 2 is a strap that holds a vacuum manifold 42 in place above the applicator wheel 15. A vacuum is developed in the manifold through a conduit 43. The manifold has an arcuate opening 44 in its bottom wall that communicates with openings (not shown) in the top wall of the applicator wheel 15, each opening in the top wall communicating with one of the openings 18 in the edge 17 of the applicator wheel 15. As will be seen, a vacuum is applied through the arcuate opening 44 in the manifold 42 to only those openings 18 that are covered by the part of the severed length of tape assembly not yet engaged with the bottle cover 14. A vacuum is applied within the vacuum platen 24 by conduit means that are not illustrated.

After a length of tape assembly 16 has been wrapped around a bottle 10 and bottle cover 14 by the applicator wheel 15 and vacuum platen 24, the bottle continues to a heat-shrinking station where the band is subjected to heat sufficient to shrink the backing 20. The shrinking causes the tape assembly to be drawn inwardly into the corner formed by the bottom edge of the bottle cover 14 and the side of the bottle 10. Since the backing 20 shrinks and the tear strip 22 either does not shrink or shrinks less than the backing, the tape assembly curves outwardly where it is free to do so. It is free to curve in the area between the two longitudinal cuts 33, and, as a result, a small outwardly curved pull-tab 46 is formed during the shrinking operation. This tab may be easily grasped by consumers and pulled, whereupon the backing 20 tears as shown in FIG. 4 and the band of tape assembly is ruptured.

The heat-shrinkable backing of a tape assembly of the invention can be made from a variety of materials, such as polyethylene terephthalate (see U.S. Pat. Nos. 3,631,899 and 3,718,495) or polyvinyl chloride. Also a variety of adhesives are useful, such as acrylate pressure-sensitive adhesives taught in Re. 24,906, rubber-resin pressure-sensitive adhesives, or heat- or solvent-activatable adhesives. Pressure-sensitive adhesives are much preferred, because they cause immediate adhesion of a tape assembly to an article. The tear strip 22 may also be made from a variety of materials; one especially useful material is a nonshrinkable form of polyethylene terephthalate.

Instead of making the longitudinal cuts in a backing of a tape assembly at an early stage as with the illustrated apparatus, the cuts may be made at the time the length of tape assembly to be wrapped around the article is cut from a continuous length of tape assembly. In that case, the blade severing the length of tape assembly is formed with perpendicular blade extensions that form the longitudinal cuts. Or the longitudinal cuts can be formed by a cutting wheel such as the wheel 31 after a length of tape assembly has been severed from the rest of the tape assembly.

What is claimed is:

1. A method for providing an easily rupturable tape seal on an article comprising:
   1. adhering onto the article an elongated tape assembly that comprises (a) an elongated tape backing that is heat-shrinkable at a useful elevated temperature, (b) a layer of adhesive carried on an inside surface of said backing for adhering the tape assembly to the article, and (c) an elongated tear strip that is adhered to the layer of adhesive, is at least substantially less heat-shrinkable at said elevated temperature than the backing, is narrower in width than the backing, and is disposed between the layer of adhesive and the article in longitudinal alignment with the backing and intermediate the outer edges of the backing;
   2. making short longitudinal cuts in an end of the backing on each side of the tear strip; and
   3. subjecting the tape assembly to said elevated temperature to shrink the backing into tight engagement with the article, whereupon a pull-tab is formed by an outward curving of the portion of the tape assembly located between the longitudinal cuts in the backing.

2. A method of claim 1 in which the layer of adhesive on the backing is a pressure-sensitive adhesive.

3. A method of claim 1 in which the longitudinal cuts in the backing are made prior to adhering the tape assembly onto the article.

4. A method of claim 1 in which the backing is unwound from a first roll and the tear strip is unwound from a second roll; and the backing and tear strip are brought into assembly and then wrapped around the article.

5. A method of claim 1 in which the tape assembly is wrapped around the article to form an overlapping band.

6. A method for providing an easily rupturable tape seal around an article comprising:
   1. positioning around the article an elongated tape assembly that comprises (a) an elongated tape backing that is wrapped so that the ends of the backing overlap and that is heat-shrinkable at a useful elevated temperature, (b) a layer of pressure-sensitive adhesive carried on an inside surface of said backing for adhering the tape assembly to the article, and (c) an elongated tear strip that is adhered to the layer of adhesive, is at least substantially less heat-shrinkable at said elevated temperature than the backing, is narrower in width than the backing, and is disposed between the layer of adhesive and the article in longitudinal alignment with the backing and intermediate the outer edges of the backing;
   2. making short longitudinal cuts in the exposed overlapping end of the backing on each side of the tear strip; and
   3. subjecting the tape assembly to said elevated temperature to shrink the backing into tight engagement with the article, whereupon a pull-tab is formed by an outward curving of the portion of the tape assembly located between the longitudinal cuts in the backing.

7. A method of claim 6 in which the backing is unwound from a first roll and the tear strip is unwound from a second roll; and the backing and tear strip are brought into assembly and then wrapped around the article.

8. An article having an easily rupturable tape seal that comprises (a) an elongated backing that has been heat-shrunk into tight engagement with the article and is adhered to the article by a layer of adhesive carried on one side of the backing, and (b) an elongated tear strip that is narrower in width than the backing and is positioned between the layer of adhesive and the article in longitudinal alignment with the backing and intermediate the outer edges of the backing; said tear strip being at least substantially less heat shrinkable than said backing at the elevated temperature used to shrink the backing into tight engagement with the article, and being adhered to the backing by the layer of adhesive, the backing having short longitudinal cuts in an exposed end of the backing, and the portion of the backing between the longitudinal cuts and the portion of the tear strip adhered to that portion of the backing curving outwardly away from the article to form a tab that may be grasped and pulled, whereby the tear strip ruptures the seal.

9. An article of claim 8 in which the layer of adhesive on the backing is a pressure-sensitive adhesive.

10. An article of claim 8 in which the ends of the backing overlap to form a continuous band extending around the whole article.

* * * * *